(12) United States Patent
Field et al.

(10) Patent No.: US 8,214,641 B2
(45) Date of Patent: Jul. 3, 2012

(54) FILE ACCESS IN MULTI-PROTOCOL ENVIRONMENT

(75) Inventors: Scott A Field, Redmond, WA (US); Paul J Leach, Seattle, WA (US); Roopesh C Battepati, Sammamish, WA (US); Michael C Johnson, Bothell, WA (US)

(73) Assignee: Microsoft Corporation, Redmond, WA (US)

(*) Notice: Subject to any disclaimer, the term of this patent is extended or adjusted under 35 U.S.C. 154(b) by 928 days.

(21) Appl. No.: 11/843,752

(22) Filed: Aug. 23, 2007

(65) Prior Publication Data

US 2009/0055921 A1 Feb. 26, 2009

(51) Int. Cl.
*H04L 29/06* (2006.01)
(52) U.S. Cl. .................................. 713/165
(58) Field of Classification Search .................. 713/165
See application file for complete search history.

(56) References Cited

U.S. PATENT DOCUMENTS

| | | | |
|---|---|---|---|
| 5,628,007 A | 5/1997 | Nevarez | |
| 5,764,889 A * | 6/1998 | Ault et al. | 726/17 |
| 6,006,018 A | 12/1999 | Burnett et al. | |
| 6,023,706 A | 2/2000 | Schmuck et al. | |
| 6,457,130 B2 | 9/2002 | Hitz et al. | |
| 6,826,582 B1 | 11/2004 | Chatterjee et al. | |
| 7,139,883 B2 | 11/2006 | Aasheim et al. | |
| 7,196,808 B2 * | 3/2007 | Kofman et al. | 358/1.15 |
| 2004/0186844 A1 | 9/2004 | Muhlestein | |
| 2005/0055360 A1 | 3/2005 | Chang et al. | |
| 2007/0088761 A1 | 4/2007 | Shimizu et al. | |
| 2007/0157017 A1 | 7/2007 | Barron, Jr. et al. | |

OTHER PUBLICATIONS

He, et al., "Enforcing Enterprise-wide Policies Over Standard Client-Server Interactions", In: Proceedings of 24th IEEE Symposium on Reliable Distributed Systems, Oct. 26-28, 2005, pp. 119-131.
International Search Report and Written Opinion Received for PCT Application No. PCT/US2008/072820, mailed on Feb. 24, 2009, 11 pages.
"NTFS File Attributes", retrieved on May 23, 2007 at <<http://www.pcguide.com/ref/hdd/file/ntfs/filesAttr-c.html>>, pp. 1-3.
"Will Image Installs Benefit Vista Adopters?", retrieved on May 23, 2007 at <<http://backslash.slashdot.org/article.pl?sid=06/07/25/197255>>, pp. 1-13.
Ducharme, "RDF: Store Metadata about Anything, Anywhere", retrieved on May 23, 2007 at <<http://www.snee.com/xml/rdf-drdobbs.html>>, pp. 1-6.

* cited by examiner

*Primary Examiner* — Jacob Lipman (57) ABSTRACT

Aspects of the subject matter described herein relate to providing file access in a multi-protocol environment. In aspects, a file server is operable to receive requests formatted according to two or more file access protocols. If a request is formatted according to a first file access protocol, the file server applies access rights associated with the file to an account associated with a requester to determine whether to grant access. If the request is formatted according to the second file access protocol, the file server may first attempt to find an account for the requester. If an account is not found, the file server may then grant access based on access rights associated with the file as applied to information in the request without consulting an account on the file server.

6 Claims, 8 Drawing Sheets

SECURITY DATA

ACCESS CONTROL LIST

ACCESS CONTROL ENTRY

FILE ACCESS IN MULTI-PROTOCOL ENVIRONMENT

BACKGROUND

In the computing world, there are many different protocols for accessing files. Two of the most popular protocols are Server Message Block (SMB) sometimes called Common Internet File System (CIFS) and Network File System (NFS). Each of these protocols uses a different security mechanism for allowing access to files. Unfortunately, this makes it more difficult to provide and maintain a file server that is interoperable with both protocols while preserving access features from both.

SUMMARY

Briefly, aspects of the subject matter described herein relate to providing file access in a multi-protocol environment. In aspects, a file server is operable to receive requests formatted according to two or more file access protocols. If a request is formatted according to a first file access protocol, the file server applies access rights associated with the file to an account associated with a requester to determine whether to grant access. If the request is formatted according to the second file access protocol, the file server may first attempt to find an account for the requester. If an account is not found, the file server may then grant access based on access rights associated with the file as applied to information in the request without consulting an account on the file server.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Exemplary Operating Environment

Figure 1:
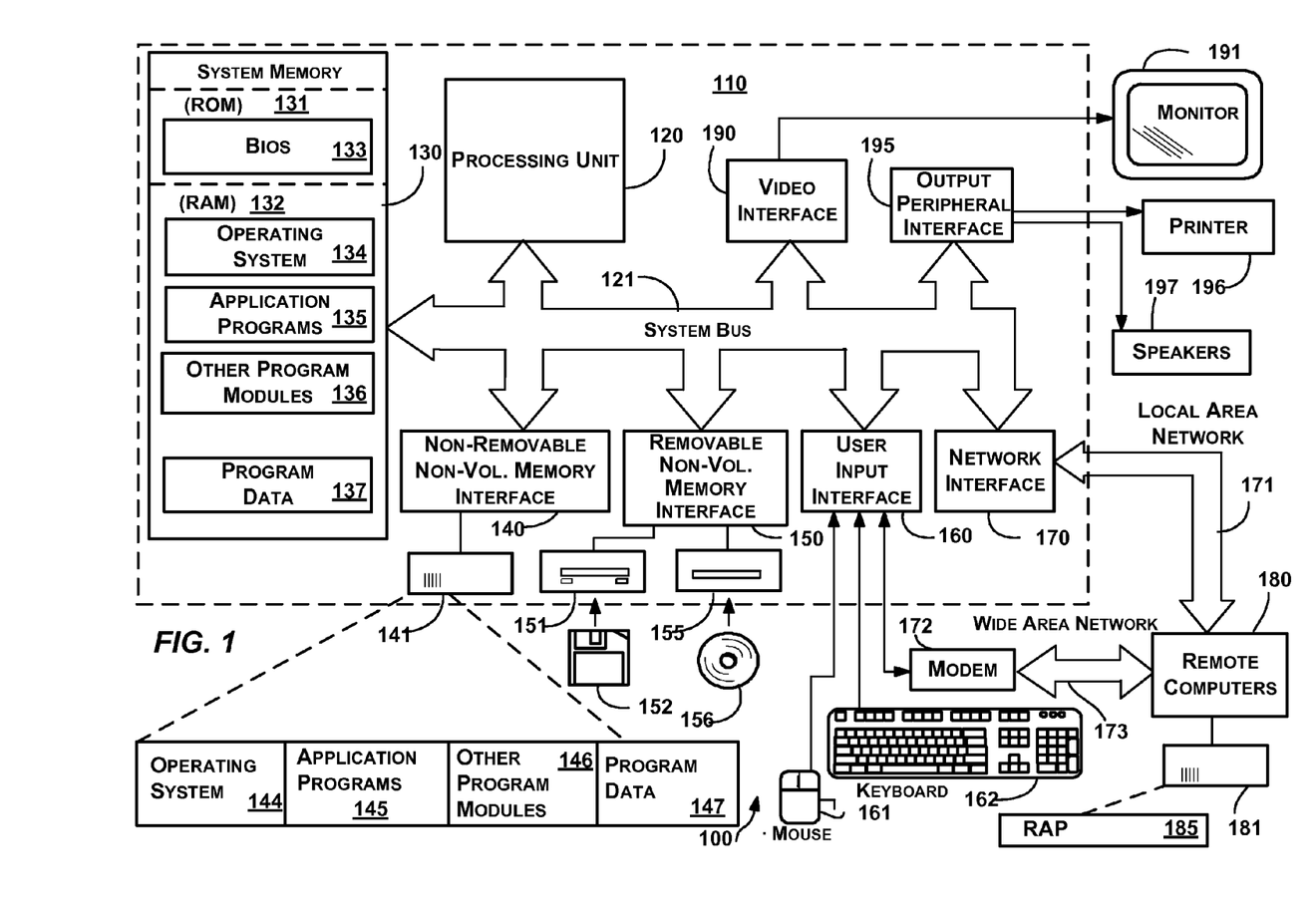
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like.

These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Accessing Files

Figure 2:
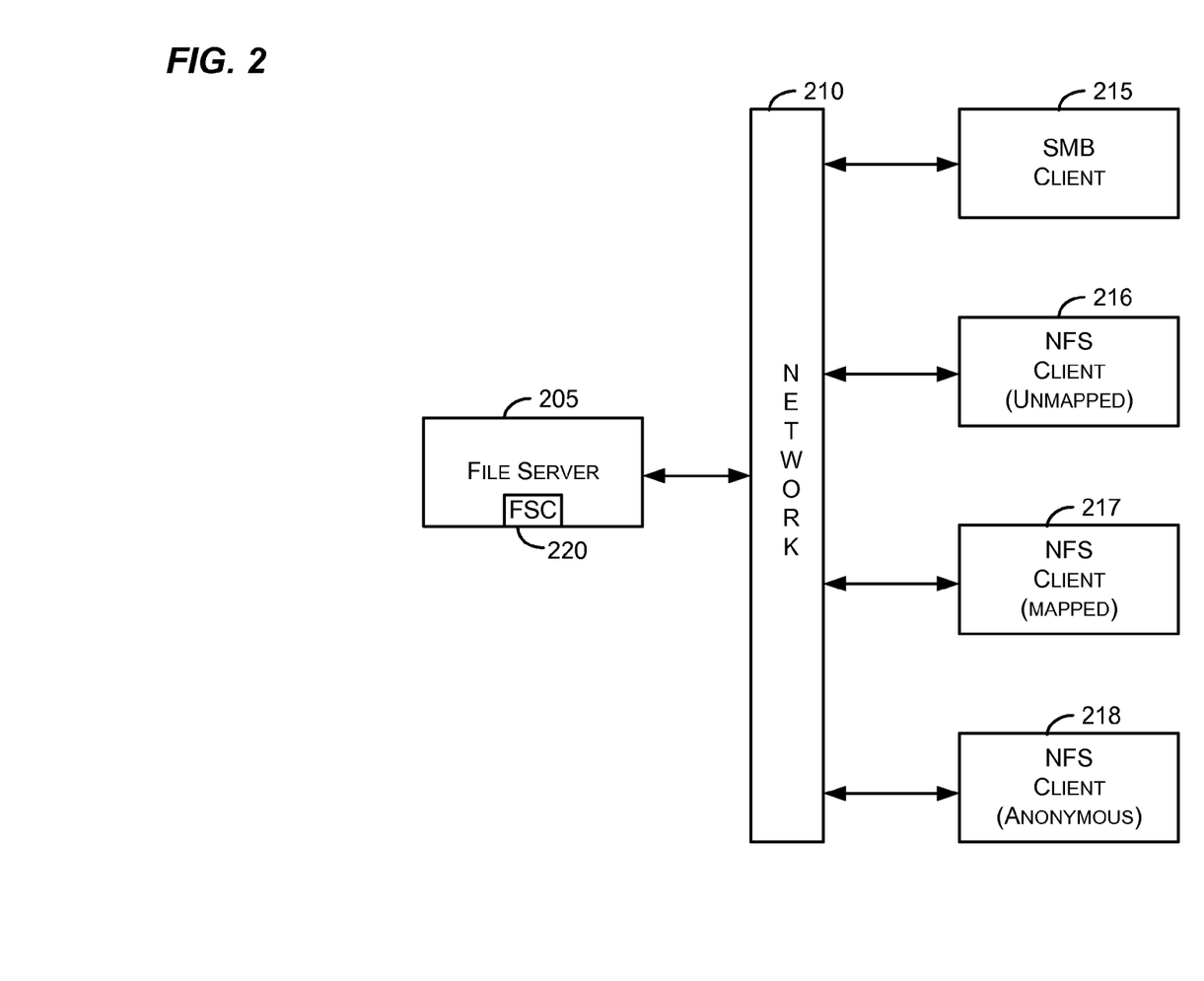
FIG. 2 is a block diagram representing an exemplary environment in which aspects of the subject matter described herein may be implemented.

As mentioned previously, many protocols may be used for accessing files. FIG. 2 is a block diagram representing an exemplary environment in which aspects of the subject matter described herein may be implemented. The environment includes a file server 205, a network 210, and clients 215-218 and may include other entities (not shown). The various entities may communicate with each other via various networks including intra- and inter-office networks and the network 210. In one embodiment, the network 210 may comprise the Internet.

Each of the file server 205 and the clients 215-218 may be implemented on or as one or more computers (e.g., the computer 110 as described in conjunction with FIG. 1). The file server 205 may include or provide access to storage via file system components 220. The file system components 220 may be structured to provide access to files via a variety of file access protocols including NFS and SMB.

The file server 205 may be internally structured to provide security to objects thereon via a particular access rights mechanism. For example, in one embodiment, the file server 205 may operate using Windows® file security such as that used by the NT file system (NTFS). In some versions of Windows® operating systems, each object (e.g., file or folder) in the file system is protected by a security descriptor (SD) also sometimes referred to as "security data". A SD is a block of data that may include an owner security identifier (SID), a group SID, a discretionary access control list (DACL), a system access control list (SACL), and control flags.

As used herein, unless clear from the context otherwise, the term "file" is understood to mean file and/or folder. Whenever the term "file" is used, in one embodiment, it should be replaced with "folder," while in another embodiment, it should remain as is. The term "object" includes a file and/or a folder. The term "folder" is synonymous with the term "directory."

The SID represents a security principal which is an entity (e.g., a user, group, etc.) that can be identified and verified via authentication. The DACL describes access rights that an entity may have to a file while the SACL describes any auditing requirements for the file if system auditing policies are enabled.

A DACL may include a header followed by a list of zero or more access control entries (ACEs). Each ACE may include a SID of a user or group, an access mask that specifies the permissions being granted or denied, a type that indicates whether the permissions in the access mask are granted or denied, and flags.

Clients may be able to access files via one or more protocols. As shown in FIG. 2, one client (e.g., SMB client 215) is capable of accessing files via the SMB protocol while the other three clients 216-218 are capable of accessing files via a NFS protocol.

When accessing a file, a NFS client may provide a user identifier (UID) and group identifier (GID). The file server 205 may include or have access to a mapping service that maps UIDs/GIDs to Windows® accounts. When the file server 205 receives a NFS file access request, the file server 205 may use the UID/GID of the request to first attempt to lookup a valid Windows® account. If an account is found, the file server 205 may use the access rights associated with the account in determining allowed access to the file system.

If a valid account is not found, one of various actions may happen. If the file server 205 does not accept unmapped NFS clients but does accept anonymous NFS clients, the file server 205 may provide access to the file system via an anonymous account using access rights granted to the anonymous account. An "unmapped NFS client" corresponds to a UID/GID for which no matching Windows® account is found in a lookup table. If the file server 205 accepts unmapped NFS clients, the file server 205 may use the UID/GID together with any access privileges associated with the UID/GID to create a custom security identifier (SID). The custom SID may be formatted using formats defined by the underlying security system. Access privileges may then be associated with the SID and used by the underlying file system in granting/denying access to files.

Note that the file server 205 may expose one or more volumes via universal naming convention (UNC) names or the like. Each volume may be associated with one or more types of access (e.g., mapped, unmapped, anonymous, and so forth). A mapped type is a volume that is accessible via NFS clients that map to accounts native to the file server 205. An unmapped type is a volume that is accessible to NFS clients that do not map to accounts that are native to the file server 205. An anonymous volume is a volume that may be accessed by any NFS client via rights associated with an anonymous account. If a volume is of one type, it may be converted to another type through a utility or otherwise, if desired.

In another embodiment, aspects of the subject matter described herein may be applied to a network share (sometimes referred to simply as a "share"). A share allows multiple computers to access a file system location such as a directory and may allow the computers to access subdirectories and files of the file system location. The share may be named via a UNC name and a volume may have any number of shares. Whenever (except in this paragraph) the term volume is used herein, in one embodiment, it should be replaced with "share," while in another embodiment, it should remain as is.

As illustrated in FIG. 2, the NFS client 216 is an unmapped client meaning that the file server 205 has no corresponding security principal for the UID/GID presented by the NFS client 216. The NFS client 217 is mapped meaning that the file server can find a corresponding security principal for the UID/GID presented by the NFS client 217. The NFS client 218 is anonymous meaning that the file server 205 cannot find a corresponding security principal for the UID/GID presented by the NFS client 218. In addition, to allow anonymous access, the file server 205 may be configured to not allow unmapped access while allowing anonymous access.

The SMB client 215 may present credentials in a manner understood by the underlying security of the file server 205. For example, if the file server implements a Windows® based file system, the SMB client 215 may present credentials that allow the file server 205 to look up an account and apply rights associated therewith on the underlying file system.

The file server 205 may provide access to a storage area network (SAN), network attached storage (NAS), one or more other storage devices, and the like.

Although some exemplary file access protocols such as NFS and SMB are mentioned, in other embodiments, other file access protocols may be used. Furthermore, aspects of the subject matter described herein should not be limited to inserting NFS information in a security descriptor of an SMB file system access. Indeed in other embodiments, metadata about files accessed via file systems protocols other than NFS or SMB may be inserted in native data structures used by a file system that provides access to the files.

Although the environment described above includes one file server and four clients of various types, it will be recognized that more, fewer, or a different combination of these and other entities may be employed without departing from the spirit or scope of aspects of the subject matter described herein. Furthermore, the entities and communication networks included in the environment may be configured in a variety of ways as will be understood by those skilled in the art without departing from the spirit or scope of aspects of the subject matter described herein.

Figure 3:
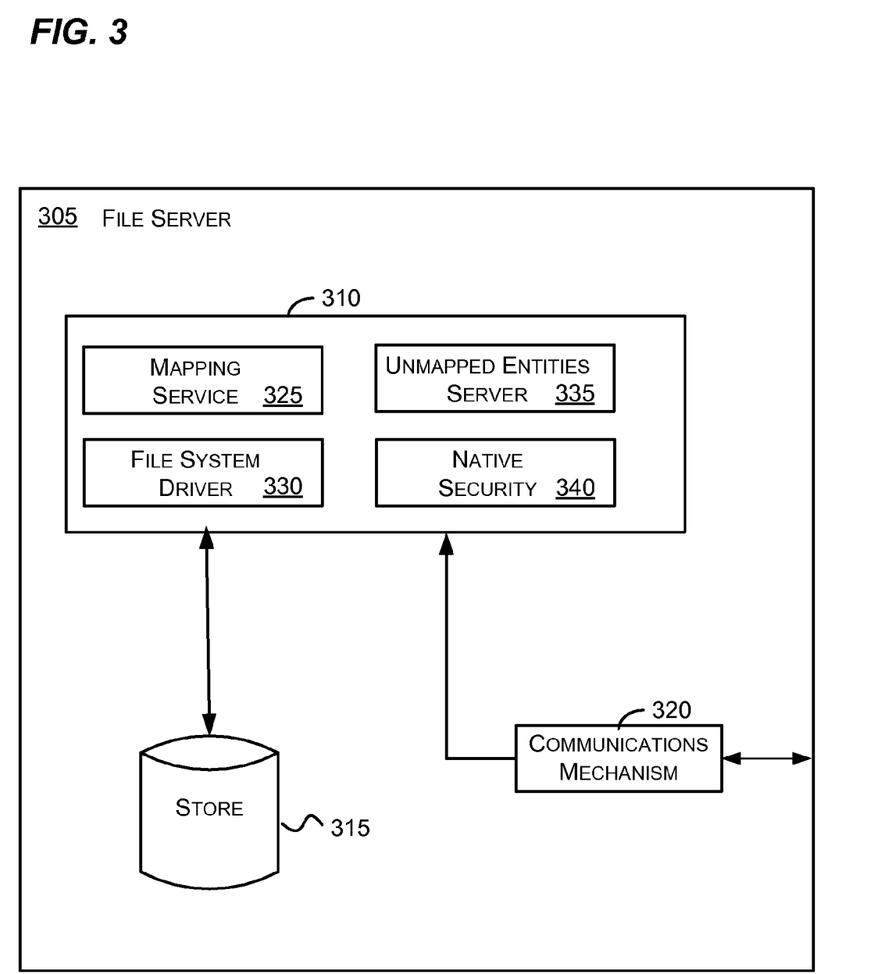
FIG. 3 is a block diagram representing a file server configured to provide access to storage in accordance with aspects of the subject matter described herein.

FIG. 3 is a block diagram representing a file server configured to provide access to storage in accordance with aspects of the subject matter described herein. The file server 305 may include file system components 310, a store 315, and a communications mechanism 320. The file system components may include a mapping server 325, an unmapped entities server 335, a native security server 340, and a file system driver 330.

The store 315 is any storage media capable of storing data. The term data should be read to include information, program code, program state, program data, and the like. The store 315 may comprise a file system, database, volatile memory such as RAM, other storage, some combination of the above, and the like and may be distributed across multiple devices. The store 315 may be external or internal to the file server 305.

The communications mechanism 320 allows the file server 305 to communicate with clients that seek access to files on the file server 305. The communications mechanism 320 may be a network interface or adapter 170, modem 172, or any other mechanism for establishing communications as described in conjunction with FIG. 1.

The file system driver 330 may comprise one or more processes that interface with the store 315. In one embodiment, the processes may be part of a filter stack that performs various translations between a portion of a file requested and a location of the portion of the file on one or more disks that form the store 315.

The mapping service 325 may comprise one or more processes that map a UID/GID to an account of the underlying security system. The mapping service 325 may utilize a database, file, or other data store to perform its mapping. If a valid account is found for a UID/GID, then the rights of the account may be used to determine if access to a requested file is allowed. If a valid account is not found, then unmapped or anonymous rights may be used as described previously. In one embodiment, the mapping service 325, in whole or part, may execute on the file server 305. In other embodiments, the mapping service 325 may execute on one or more devices other than the file server 305.

The unmapped entities server 335 grants or denies access to files for entities that do not map to an account of the underlying security system. How the unmapped entities server 335 does this is described in conjunction with various figures below. In brief, the unmapped entities server 335 encodes and decodes entity identity information using data structures of the native security system.

The native security component 340 provides access to files based on a native security mechanism of the file server 305. For example, natively, the file server 305 may first authenticate a requesting entity and establish a secure session with the entity. File access requests sent via the session may be granted or denied access based on applying an access control list to the identity of the entity as established during authentication. In one embodiment, a native security mechanism utilizes Windows® SIDs as its entity identifiers while non-native security mechanism uses UNIX UIDs and GIDs.

Figure 4:
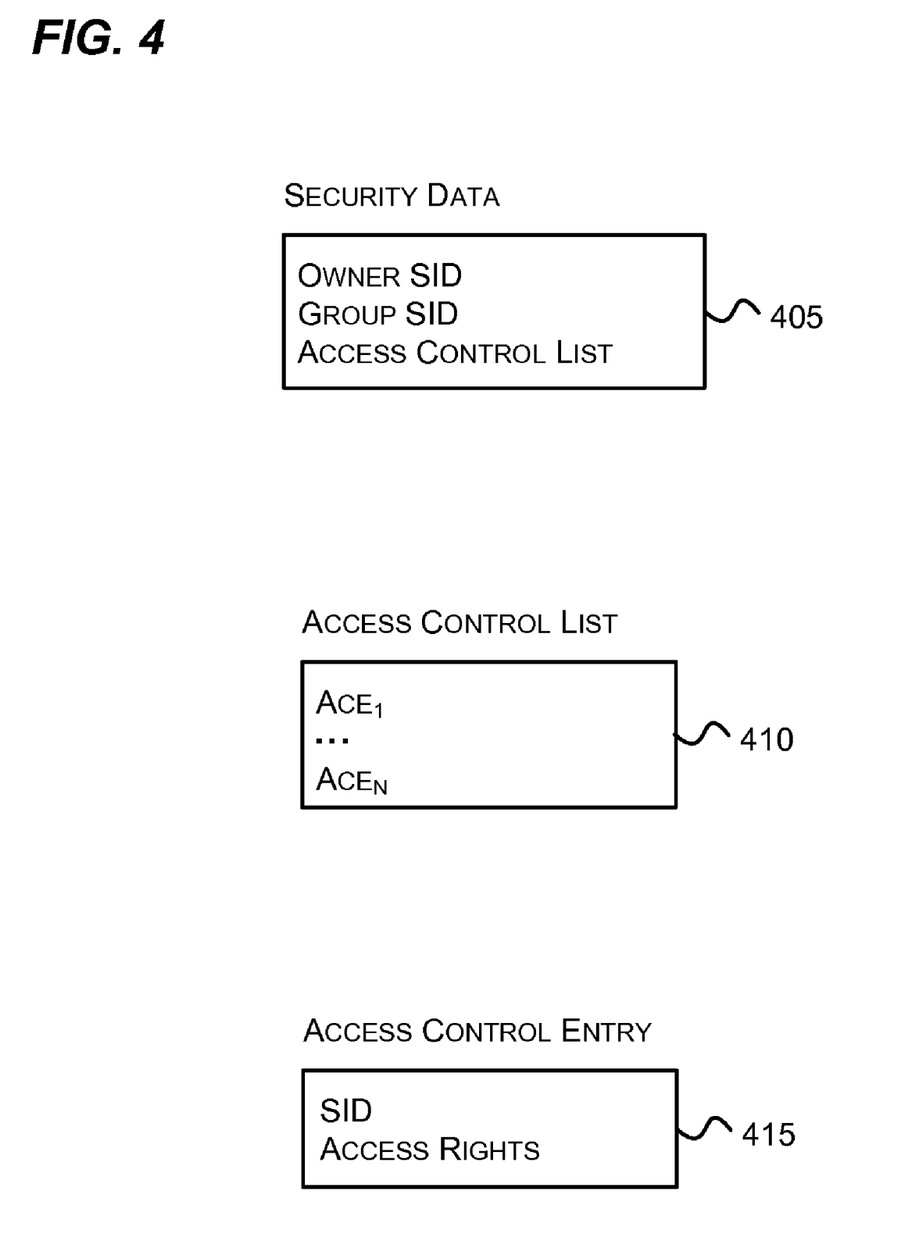
FIG. 4 illustrates exemplary data structures that may be used in accordance with aspects of the subject matter described herein.

FIG. 4 illustrates exemplary data structures that may be used in accordance with aspects of the subject matter described herein. The data structures include a security data 405, an access control list 410, and an access control entry 415.

Security data such as the security descriptor 405 may be associated with a particular file. A security descriptor may include state that indicates security associated with the file. In an embodiment, a security descriptor may include an owner security identifier (SID), a group SID, and an access control list (ACL). The owner SID is an identifier that identifies an entity that owns the file. An entity that owns a file may change what entities are allowed to access the file and how they may access the file by modifying the access control list.

A SID may be divided into various fields and may be variable or fixed length. In one embodiment, a SID may include an authority value and one or more subauthority values. An authority identifies a namespace while subauthorities identify sub namespaces. In some Windows® file systems, an NT Authority namespace is represented by an authority value of 5.

A group SID is an identifier that identifies the primary group to which the owner of the file belongs. In a file system, a group may be given one set of access privileges to a file while an entity within the group may be given another set of access privileges to the file.

An ACL such as the ACL 410 may include zero or more access control entries (ACEs). The ACEs define which entities may access the file and how they may access the file.

An ACE such as the ACE 415 may include a SID and access rights. The SID identifies an entity which may include a group, a user, a machine, a process, or the like. The access rights indicate what rights the entity has (or does not have) to the file. Some exemplary rights include read, write, delete, execute, traverse, and the like.

When a file is a directory, the traverse right indicates whether the entity has a right to access a file in the directory. In some file systems, to have access to a file in a directory, an entity needs traverse rights to each and every directory that is a containing object of the file or a directory thereof. In other file systems, to have access to a file in a directory, an entity simply needs to have traverse rights to the immediate directory that includes the file.

When an unmapped NFS client attempts to access a file various actions may occur as described in more detail below in conjunction with FIGS. 5-8. If the unmapped NFS client successfully creates a file, the UID/GID of the NFS client or a derivative thereof (e.g., a hash) may be inserted into a SID that may be placed in a security descriptor associated with the file. When the underlying file system is not NFS based (e.g., an NT file system), the SID may include an authority or subauthority value that indicates that the SID is a custom SID for unmapped NFS access to the file. The access rights granted or denied to entities may be placed in the SID and/or in one or more ACEs that are stored in an ACL. This ACL may also be placed in the security descriptor. This information may then be used to determine whether subsequent entities that request access to the file should be given the access requested.

In addition to ownership, group, and access rights of a file, any other metadata about a file may also be placed in a SID and/or ACL placed in a security descriptor associated with a file. A SID may have a size limit in a particular operating system. In some embodiments, the size limit may be around 60 bytes, for example. In such embodiments if the metadata that needs to be stored regarding a file exceeds 60 bytes, multiple SIDs may be used and stored in an ACL which is associated with the file. Each SID may have an authority or subauthority that identifies the SID as a repository for metadata about the file. A flag in a SID may be set to indicate that at least one other SID includes additional metadata about the file.

To recover metadata, the ACL may be retrieved from the file system and then scanned, looking at each ACE. When an ACE including a SID with an appropriate authority or subauthority is located the remainder of the SID can be decoded to retrieve the desired metadata.

Following is an example of some pseudo-code that may be used to encode an NFS user ID in a SID:

```
#define SECURITY_NFS_AUTHORITY    {0, 0, 0, 0, 0, 6}
#define SECURITY_NFS_RID_COUNT    2 /* one for the key + one
                                       for the
                                       UID/GID/mask */
#define SECURITY_NFS_RID_ID_USER            1
#define SECURITY_NFS_RID_ID_GROUP           2
#define SECURITY_NFS_RID_PERMISSIONS_MASK   3
sidUid = Allocate(
    NonPagedPool,
    LengthRequiredSid (SECURITY_NFS_RID_COUNT));
InitializeSid (sidUid,
        &nfsSidAuthority,
        SECURITY_NFS_RID_COUNT);
*(SubAuthoritySid (sidUid, 0)) = SECURITY_NFS_RID_ID_USER;
*(SubAuthoritySid (sidUid, 1)) = Uid;
```

Similarly, an NFS GID and permission mask may be encoded into other SIDs. As an example, three SIDs encoding a UID, GID, and permission masks may be represented as strings as follows:

1. S-1-6-1-15
2. S-1-6-2-20048
3. S-1-6-3-755

The 6 in the SIDs above indicate an NFS authority. The numbers after the 6 (i.e., 1, 2, and 3) indicate what follows, namely, a 1 indicates that a UID follows, a 2 indicates that a GID follows, and a 3 indicates a permissions mask.

It will be recognized that the pseudo-code and encoding for representing NFS security data in SIDs is exemplary and that other encodings for representing security data in one or more SIDs may be used without departing from the spirit or scope of aspects of the subject matter described herein.

FIGS. 5-8 are flow diagrams that generally represent exemplary actions that may occur in accessing files accordance with aspects of the subject matter described herein. For simplicity of explanation, the methodology described in conjunction with FIGS. 5-8 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Figure 5:
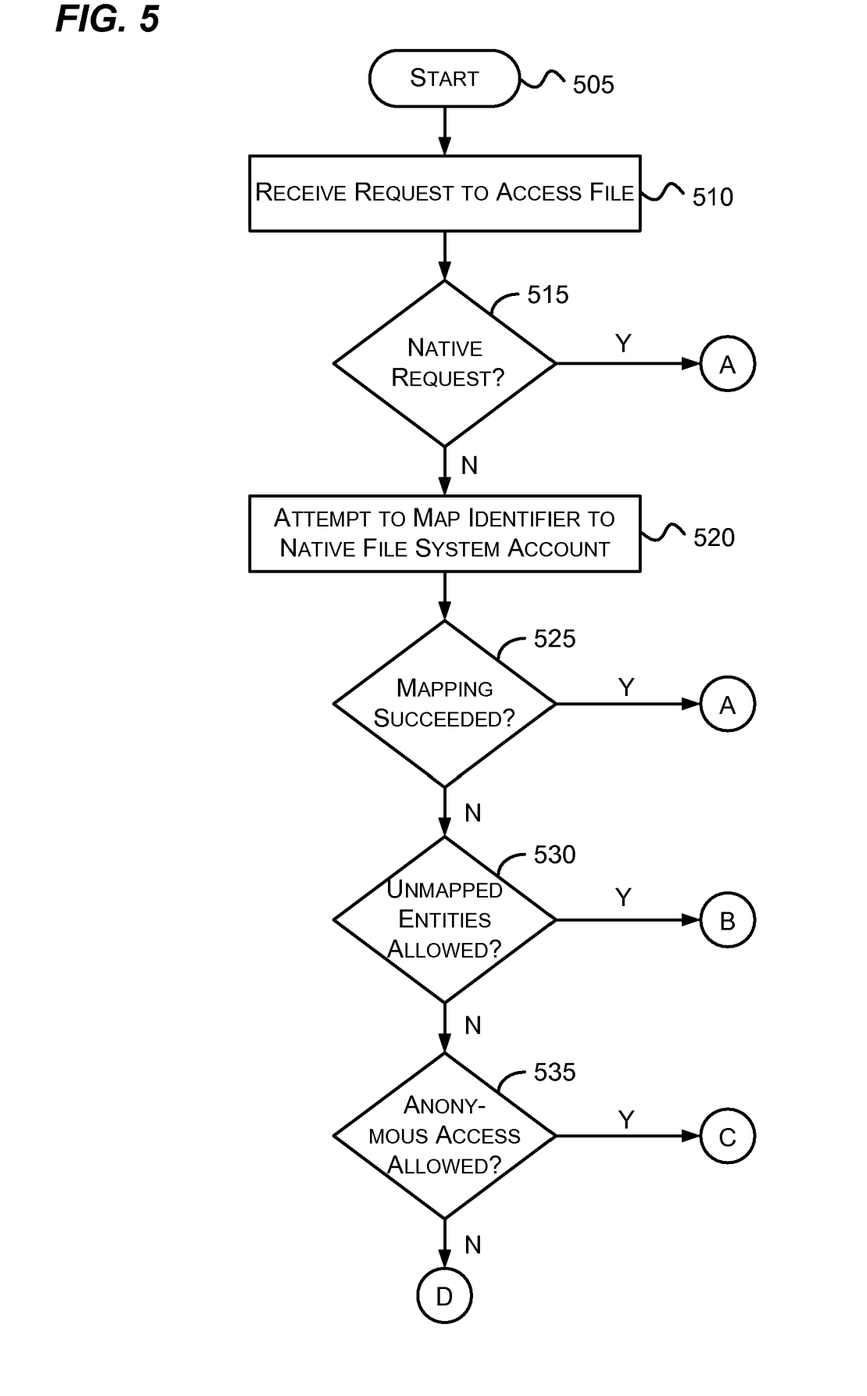
FIGS. 5-8 are flow diagrams that generally represent exemplary actions that may occur in accessing files accordance with aspects of the subject matter described herein.

Turning to FIG. 5, at block 505, the actions begin. At block 510, a request to access a file is received. For example, referring to FIG. 2, the file server 205 receives a request from one of the clients 215-218.

At block 515, a determination is made as to whether the request is a native request. If so, the actions continue at block 610 of FIG. 6; otherwise, the actions continue at block 520 of FIG. 5. The term "native" as used here implies that the request is formatted/presented in such a way that the file server can determine whether there is a corresponding native account on the file server. By native account it is meant that there is no need to map an identity presented by the request into an account that can then be used to access the requested file. Instead, through some exchange of data previous to or in conjunction with the request, an account can be found that corresponds to a requester of the request. This account can then be used to determine whether to grant access to the requested file.

For example, in a file server that natively supports the SMB protocol, a client may first communicate with the file server to establish the client's identity and may establish a session with the file server. Using the client's identity, the file server may lookup a native account for the client. In receiving subsequent access requests communicated via the session, the file server may use the account in determining whether to grant the client access. For example, referring to FIG. 2, if the file server 205 is a native SMB file server and receives a request to access a file from the SMB client 215, the file server 205 may grant access to the file based on the account associated with the SMB client 215.

At block 520, the file server attempts to map an identifier (e.g., UID/GID) included in the request to a native system account. If this succeeds and an account is found, then at block 525, the actions continue at block 610 of FIG. 6; otherwise, the actions continue at block 530. For example, referring to FIG. 2, if the file server 205 receives a request from the client 217, then it can find an account associated with the client 217 and use the account in determining whether to grant access to the file. If the file server 205 receives a request from the client 216, then the actions would continue at block 530.

At block 530, a determination is made as to whether unmapped entities are allowed. If so, the actions continue at block 705 of FIG. 7; otherwise, the actions continue at block 535 of FIG. 5. A system administrator or the like may have the ability to configure a file server to allow or disallow unmapped entities to access files on the file server. In one embodiment, the default is to allow unmapped entities to have access.

At block 535, a determination is made as to whether to allow anonymous accesses. If so, the actions continue at block 605 of FIG. 6; otherwise, the actions continue at block 805 of FIG. 8. For example, referring to FIG. 2, if the file server 205 receives a request from the client 218 and anonymous access is allowed, the actions continue at block 605; otherwise, access is denied.

Figure 6:
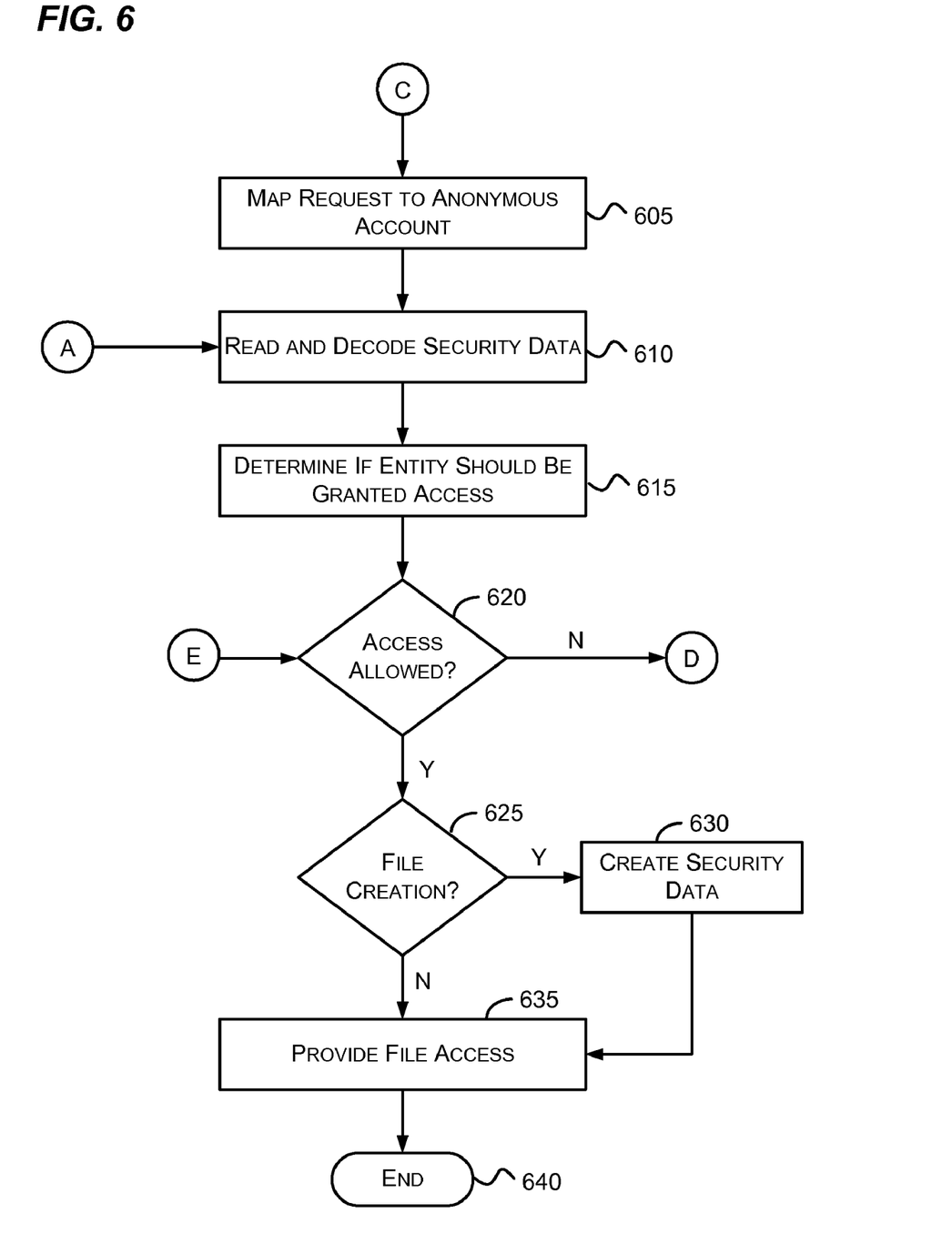

Turning to FIG. 6, at block 605, the request is mapped to an anonymous account. At block 610, the security data associated with the file is read and decoded. If the client is a mapped or native client, reading and decoding the security data may involve reading an ACL associated with the file. If the client is an unmapped client, reading and decoding the security data may involve extracting a UID/GID from the security data together with any access rights.

At block 615, a determination is made as to whether the entity should be granted access to the file. When a new file is created, this may involve reading the access rights of a containing object (e.g., a folder) to determine whether the entity has rights to create files within the containing object. When a file is modified, this may involve reading the access rights encoded in the security data (e.g., in normal SIDs, custom SIDs, and/or an ACL).

An unmapped client may be given access to a file if the security data associated with a file gives the client, a group to which the client belongs, and/or everyone access rights to the file. A mapped or native client may be given access to the file based on an ACL in the security data.

Figure 8:
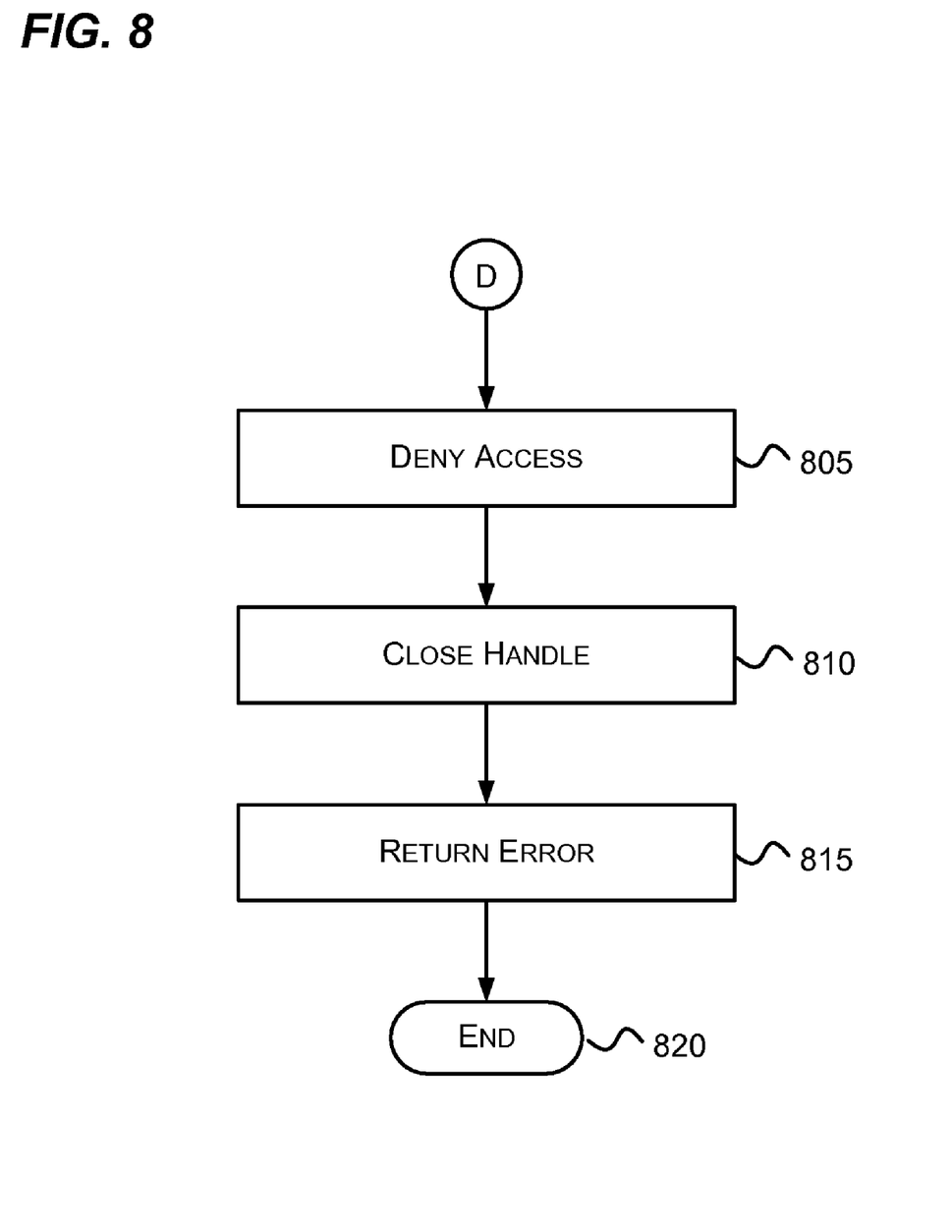

If access is allowed, then at block 620, the actions continue at block 625; otherwise, the actions continue at block 805 of FIG. 8.

At block 625, a determination is made as to whether the file access is a file creation request. If so, the actions continue at block 630; otherwise, the actions continue at block 635. In one embodiment, the actions associated with block 625 may also be performed before the actions associated with block 610. This may be done so that if the access request is a file creation request that the security data associated with the containing object may be read and decoded in block 610.

At block 630, the security data is created as appropriate. If the request is from an unmapped client, for example, the client's UID/GID and access rights may be encoded in the security data as previously described; otherwise, the access rights may be encoded in an ACL or inherited from a containing object, for example.

At block 635, file access is provided. For example, referring to FIG. 2, the file server 205 may allow one of the clients 215 to create, read, update, and/or otherwise access a file.

At block 640, the actions end.

Figure 7:
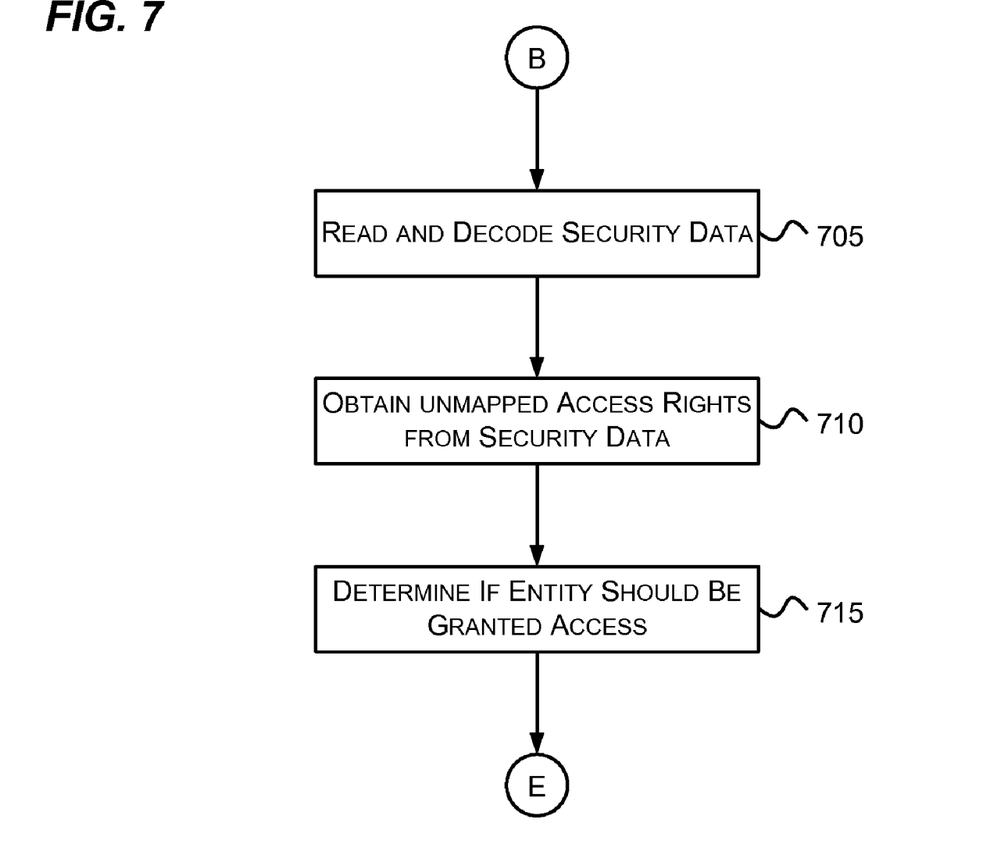

Turning to FIG. 7, at block 705, the security data associated with the file is read and decoded. For example, referring to FIG. 4, the security descriptor 405 may be obtained.

At block 710, unmapped access rights are obtained from the security data. If a client is an unmapped client, obtaining the access rights may involve extracting a UID/GID from the security data together with any access rights.

At block 715, a determination is made as to whether the entity should be granted access to the file. When a new file is created, this may involve reading the access rights of a containing object (e.g., a folder) to determine whether the entity has rights to create files within the containing object. When a file is modified, this may involve reading the access rights encoded in the security data (e.g., in normal SIDs, custom SIDs, and/or an ACL).

After block 715, the actions continue at block 620 of FIG. 6.

Turning to FIG. 8, at block 805, access to the file is denied. This may involve dropping a connection to the requester, for example, or keeping the connection open to send an error to the requester as described in more detail in conjunction with block 815.

At block 810, the handle is closed (if it was opened). At block 815, an error may be returned to the requester. For example, referring to FIG. 2, the file server 205 may inform the client 217 that it has not been allowed to access a file.

At block 820, the actions end.

As can be seen from the foregoing detailed description, aspects have been described related to providing file access in a multi-protocol environment. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A computer storage medium having computer-executable instructions, which when executed perform actions, comprising:
   receiving a request to access an object secured via a first security mechanism, the first security mechanism securing the object at least in part via security data, the security data including an entity identifier that indicates an entity associated with the object;
   determining that the request is formatted according to an object access protocol associated with a second security mechanism, the object access protocol comprises a file system protocol that includes file access information in the request, the file access information comprising a user identifier and a group identifier;
   attempting to map the user identifier and the group identifier of the request to one of a plurality of accounts of the first security mechanism, each account identifying access rights to stored objects;
   if the attempt to map is determined to be unsuccessful, determining whether unmapped entities are allowed;
   if unmapped entities are determined to be allowed,
      reading and decoding the security data, the security data further comprising a custom security identifier formatted using a format defined by the first security mechanism, the custom security identifier comprising a user identifier and a group identifier of an entity that created the object and unmapped access rights associated with the object;
      obtaining the unmapped access rights from the security data;
      determining whether the entity is granted access based on the obtained unmapped access rights;
   if unmapped entities are determined to not be allowed, determining whether anonymous access is allowed,
      if anonymous access is allowed, mapping the request to an anonymous account;
      reading and decoding the security data, the security data further comprising the custom security identifier formatted using the format defined by the first security mechanism, the custom security identifier comprising the user identifier and the group identifier of the entity that created the object and access rights associated with the object;
      obtaining access rights for the anonymous account from the security data;
      determining whether the entity is granted access based on the obtained access rights.

2. The computer storage medium of claim 1, wherein the first security mechanism is used in conjunction with a file system protocol that maintains state during a session.

3. The computer storage medium of claim 1, wherein the object comprises a file.

4. The computer storage medium of claim 1, wherein the object comprises a folder.

5. The computer storage medium of claim 1, wherein the security data comprises an owner identifier and a group identifier associated with the object.

6. The computer storage medium of claim 1, wherein the security data comprises an access control list including zero or more access control entries, each access control entry having an entity identifier and access rights granted or denied via the access control entry.

* * * * *